Dec. 29, 1959 H. EPSTEIN 2,919,170

MEANS FOR ELECTROSTATICALLY RECORDING SIGNALS

Filed Nov. 14, 1952

INVENTOR
HERMAN EPSTEIN
BY
Laurence R. Brown
ATTORNEY

United States Patent Office 2,919,170

Patented Dec. 29, 1959

2,919,170

MEANS FOR ELECTROSTATICALLY RECORDING SIGNALS

Herman Epstein, Philadelphia, Pa., assignor to Burroughs Corporation, Detroit, Mich., a corporation of Michigan Application November 14, 1952, Serial No. 320,592

6 Claims. (Cl. 346—74)

This invention relates to methods and apparatus for recording patterns upon dielectric materials, and more particularly for recording intelligible messages upon a record surface which has the property of retaining an electrostatic charge impressed thereupon.

In radio communication or other electronic systems such as computers, the medium for recording commands or other intelligence in many cases comprises a coded tape. In general, the operational speed of the equipment is limited by the speed of such recording means. Accordingly, a high speed system is desired for recording purposes.

Speed has been limited in moving tape systems by mechanical transfer methods, since it has, in the past, been impractical to transfer the intelligence to a moving tape and accordingly the tape has been brought to a complete stop during its travel through a recording device in many prior art systems. Not only does this action per se take more time to transfer a given message to a tape, but the mechanical design of the machine must take into account the relative changes of tape speed and accordingly provide more massive components. Accordingly, the system inertia is increased, and this further limits the speed of the recording system. For this reason, it would be desirable to decrease the inertia of systems necessary for both moving the tape and transferring intelligence thereto. Both features are accomplished in the present invention by electrostatically impressing a charge on the tape thereby precluding mechanical transfer systems having large inertia, as well as stop-start tape drive mechanisms.

To provide a more completely acceptable recording system, a device should be afforded which is electrically compatible with electronic coding or signaling systems. In addition, the messages must be recorded distinctly with relatively little background discoloration which might be referred to as a good signal to noise ratio. Such systems should also permanently impress the information upon the record surface.

In providing permanent records, it is desirable to use inks or other pigments. However, inks may be smudged or blotted when wet. Therefore, more acceptable records may be made when dry pigment powders are utilized to establish the intelligence patterns upon the record body.

It is, accordingly, a general object of the invention to provide improved means and methods for recording intelligible signals.

It is another object of the invention to provide high speed recording apparatus.

A further object of the invention is to decrease the inertia of recording systems.

A still further object of the invention is to provide means and methods for recording signals with dry pigments.

Other objects of the invention are to provide recording means and methods electrically compatible with electronic signaling systems and to provide clearly defined record surfaces.

Therefore, in accordance with the invention there is provided an electrical recording system and associated method for impressing patterns symbolic of information upon a suitable record surface. The invention provides means for establishing a charged pattern in a dielectric body such as a movable record tape. Dry finely divided pigment powder is thereafter attracted to the charged pattern areas to cause a visible record of the pattern when the tape is passed through a finely divided pigment cloud. A permanent fixing process such as spraying with a binder or heating the pigment powder will secure the pigment in place. Accordingly, a high recording speed may be attained in a resulting low inertia system.

Other objects and advantages of the invention will be found throughout the following description of the invention, which may be more readily understood when considered in connection with the accompanying drawings, in which.

Figures 1, 2, 3:
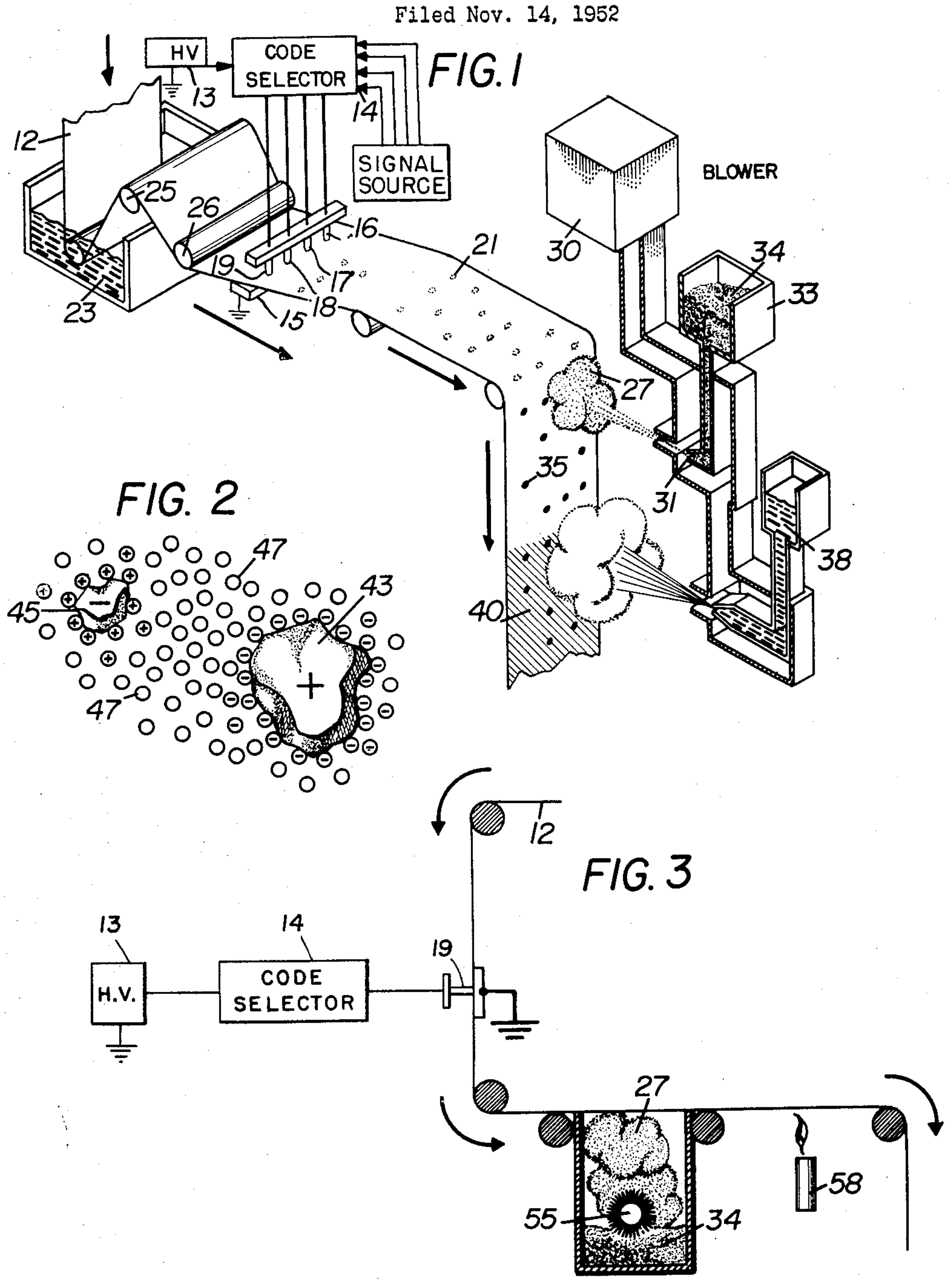
Fig. 1 is a diagrammatic representation of a recording system embodying the invention.
Fig. 2 is a schematic view of one phase of operation comprising an inking process provided in accordance with the invention.
Fig. 3 is a diagrammatic representation of a recording system embodying the invention and illustrating alternative developing and fixing stations which may be utilized in accordance with the teaching of the present invention.

A record surface which may be utilized in accordance with the invention comprises the movable dielectric tape 12 shown in Fig. 1. The tape is adapted for high speed operation with a suitable electronic code selector circuit 14 for selecting the signals supplied by a source 15 to establish a suitable charge pattern upon the tape in accordance with the intelligence to be recorded. The tape is advanced by suitable tape feeding means comprising the continuously rotatable rollers driven to advance the tape in the direction of the arrows. In the embodiment shown, the pattern comprises code groups impressed upon the tape by pin type printing electrodes 16–19, to which the potential of a grounded high voltage source 13 is selectively directed by the signal responsive electronic code selector circuit 14. An electrostatic field is thereby set up between the energized pin electrode or electrodes and a grounded base electrode 15. The dotted areas 21, etc. represent a charged pattern stored in the surface of the dielectric tape 12 as established by the recording means. The charge pattern may be controlled in a time sequence so as to build up a series of characters.

The illustrated, generally circular, form of the dots 21 which make up the latent electrostatic image pattern is characteristic of the use of cylindrical electrodes, exemplified by pin electrodes 16–19, and the dots may be considered to be the projections on the surface of the tape 12 of the end surfaces of these electrodes. The arrangement of charged areas or dots 21 on movable tape 12, in Fig. 1, illustrates the result of selective excitation of pin electrodes 16–19 at different times and in different groupings as the tape is continuously advanced by the rollers past the row of pin electrodes.

For purposes of storing the charge pattern it is desirable that the surface resistivity of the recording member, such as tape 21, be of the order of $10^{16}$ ohms per centimeter. Should the tape not have the proper dielectric characteristics to store the charge pattern, it might be passed through a bath of dielectric coating substance 23. This bath may comprise any suitable thermoplastic resin, for example, polystyrene in a 10% benzene solution by weight, or any other suitable substance which causes the tape to attain a surface resistivity in the order of $10^{16}$ ohms per centimeter. However, the resistivity may be varied depending upon the length of time the electrostatic latent image is stored on the tape before application of pigment powder thereto. Suitable heated drying rollers 25 and 26 may be provided intermediately between the bath and the recording means, if necessary. The code selector serves to commutate a high voltage in such a way as to establish the desired code pattern in the form of charged dielectric areas upon the treated dielectric surface of the tape and determines the polarity of the charged areas as will be described in connection with Fig. 2 hereinafter.

Finely divided uncharged particles having little mass will adhere to charged dielectric surfaces of the type mentioned. Accordingly, by subjecting the charged tape to a cloud 27 of finely divided pigment particles supplied by means of suitable equipment such as the blower 30 and jet 31 from the pigment reservoir 33, the code pattern comprising the dots 35 etc. becomes readily visible. Since the initial adherence of the pigment particles in the charged areas is insufficient for permanent record purposes, it is desirable to subject the record body to a fixing process to permanently hold the pigment particles in position. Pigment particles may be permanently fixed in place by a suitable treating process such as spraying or otherwise coating the tape with acrylic or like transparent liquid binder 38 which secures the pigment particles in place along the treated portion 40.

The visible display produced as above described comprises an assembly of dots 35, each dot corresponding to the excitation by a single signal impulse of a particular one of the group of pin electrodes 16–19. Because of the relatively small cross section of the pin electrodes, the charged areas resulting therefrom, regardless of their contours, become essentially dots or points.

It is readily apparent that the above described method of recording intelligence offers many advantages in a high speed system. For example, the electronic coding selector readily impresses an electrical charge in the tape 12 during continuous rapid motion. Because mechanical code selection devices are eliminated, the inertia of the system becomes relatively negligible and high speed operation may be readily attained. The record surface becomes a permanent indication of the coded pattern, and the use of dry pigment powders adhering to the electrically charged areas prevents any smearing or blotting of the ink after it has been applied. High signal to noise ratios have been attained with such systems.

Further improvement of signal to noise ratios may be attained by processing the pigment powders in accordance with a further phase of the invention described in connection with Fig. 2. Since pigment particles may adhere to a tape surface where no charge has been established, the relative signal to noise ratio may not be as high as possible. However, by mixing a powdered substance such as corn meal 43 or sand 45 with the pigment particles 47 and turbulently mixing them together by means such as jet 31, the resulting contact of the two substances will produce a triboelectric effect and cause the particles of the two substances to assume opposite polarities in accordance with their relative positions in a triboelectric series. Thus, cream of tartar, when used with the corn meal will attain a negative charge whereas lycopodium powder with sand will attain a positive charge. The ingredients are used to obtain an opposite polarity charge to that established in the record surface so that the charged areas will more firmly attract the charged pigment particles.

Because of the opposite charge on the sand or corn meal and the relatively greater mass, these substances will not tend to become affixed to the charged areas of the tape, but will cause only the charged pigment particles to be rubbed off thereon. The remaining particles will be retained more readily on the charged carrier bodies than the uncharged tape areas about the charged surface pattern. Accordingly, signal to noise ratio is substantially increased. In addition, the electric charges established on the tape tend to become neutralized so that any danger of shock due to building up a large capacity in a roll of charged tape will be eliminated.

In Fig. 3 there is shown a modified recording system embodying the invention and particularly illustrating alternative methods for developing the electrically charged areas on the tape 12 by minute pigment particles 27 and for fixing the developed or inked tape. The charged pattern areas of the tape are subjected to the cloud of pigment particles 27 produced in this embodiment by a revolving brush 55 turbulently mixing the pigment powder 34 and subjecting it to the face of the charged tape. Gravity will force the more massive elements, as described in connection with Fig. 2, to fall way from the tape and rub off a deposit of charged pigment particles only.

If the pigment particles are selected of a waxy or other thermo-plastic substance, they may be subjected to a heat treatment at position 58 to permanently attach the pigment to the record surface or cause it to penetrate the pores thereof.

It is recognized, therefore, that in accordance with the present invention there is described improved apparatus with associated methods for recording patterns upon a dielectric body. It is to be recognized that the illustrated embodiments of the invention will suggest to those skilled in the art other modifications and embodiments which may not depart from the spirit and scope of the invention.

Those features of the invention believed descriptive of its nature are defined with particularity in the appended claims.

What is claimed is:

1. Apparatus for electrically recording signals comprising, in combination, a plurality of pin electrodes, a common electrode for said pin electrodes, a support for said pin electrodes mounting them in a group with the active ends thereof closely adjacent to said common electrode and substantially equidistantly spaced therefrom, a recording member having a surface of a resistivity of approximately $10^{16}$ ohms per centimeter, means for feeding the recording member between the pin electrodes and the common electrode with said surface thereof nearest to the active ends of the pin electrodes, means for crating simultaneously a difference of electrical potential between selected ones of said pin electrodes and the common electrode to apply electrostatic fields through the recording member directly establishing by the sole instrumentality of said fields a pattern of latent electrically charged dots on the surface of the recording member, said charged dots occupying positions on the surface of the recording member corresponding to the positions of the selected pin electrodes, and means for subjecting the surface of the recording member thus charged to finely divided pigment particles to cause the particles to adhere to the areas of the charged dots of the recording member to render the dots visible.

2. Apparatus for electrically recording signals comprising, in combination, a plurality of pin electrodes, a common electrode at reference potential, a support for the pin electrodes mounting them in a group with the active terminals thereof closely adjacent to the common electrode and equidistantly spaced therefrom, means for applying a difference of electrical potential between each of said pin electrodes and the common electrode, each pin electrode when thus excited producing an electrostatic field intermediate the pin electrode and said common electrode, a recording member having a charge-retentive surface, means for feeding the recording member between the pin electrodes and the common electrode with the charge-retentive surface thereof opposed to the pin electrodes, means for selectively applying said difference of electrical potential between one, or simultaneously between a plurality, of said pin electrodes and said common electrode to produce solely by the instrumentality of said electrostatic fields variable patterns of electrostatic latent images on the charge-retentive surface of the recording member, a source of finely divided inking powder, means for passing the recording member thus charged through inking powder from said source to cause the inking powder to cling to the charged areas of the recording member, and means for treating the recording member to permanently affix the retained powder to the charge-retentive surface thereof.

3. In apparatus for producing on a charge-retentive medium rapidly and uninterruptedly moving along a predetermined path a record comprising groupings of dot-like visible markings representing selected information, the combination of means defining a recording station at one position along such path, means defining a developing station at a later position along said path, a group of spaced apart pin electrodes at said recording station having the discharge surfaces thereof adjacent to one side of said path and extending laterally of the direction of displacement of the medium therealong, electrode means cooperative with all said pin electrodes positioned adjacent thereto but spaced therefrom on the opposite side of said path so as to include the path therebetween, means for selectively energizing one, or simultaneously energizing a group, of said said pin electrodes relative to said electrode means to a potential sufficient to electrostatically charge a charge-retentive medium travelling along said path between said electrode means and said pin electrodes, means at said developing station for causing uncharged powdered material to come in contact with a medium so charged travelling along said path, and means for rapidly and uninterruptedly transporting such a medium along said path.

4. In apparatus for recording information at high speeds on a charge-retentive medium as a variable pattern of dot-shaped electrostatic charges, the combination of base electrode means, a plurality of independently energizable pin-type recording electrode means arranged in a cooperative opposed relation to the base electrode means and similarly spaced therefrom to define a gap therebetween into which a medium having the aforesaid characteristic may be introduced to receive such dot-shaped charges as a result of electric fields in the gap produced by energization of the pin electrodes, and means for selecting a group of pin electrodes and simultaneously energizing the electrodes of said selected group at a predetermined potential relative to the base electrode means to produce electric fields of recording value at positions in the gap corresponding to the energized electrodes, thereby to form different patterns of dot-shaped electrostatic charges on a medium introduced into the gap.

5. Apparatus for electrically recording signals comprising, in combination, a plurality of pin electrodes, a common electrode for said pin electrodes, a support for said pin electrodes mounting the electrodes in closely spaced relationship in a group with the active ends thereof closely adjacent to said common electrode and substantially equidistantly spaced therefrom, a recording member having a surface characterized by the ability of indefinitely storing an electrostatic charge impressed thereupon, means for feeding the recording member between the pin electrodes and the common electrode with said surface thereof nearest to the active ends of the pin electrodes, means for selectively creating a difference of electrical potential of recording value between a selected one, or simultaneously between a selected group, of said pin electrodes and the common electrode thereby to create electrostatic fields extending through the recording member and establishing by the sole instrumentality of said fields a pattern of latent electrically charged dots on said surface of the recording member, said charged dots occupying positions on said surface corresponding to the positions of the selected pin electrodes, and means for subjecting said surface of the recording member thus charged to finely divided pigment particles thereby to cause the particles to adhere to the areas of the charged dots of the recording member and render said dots visible.

6. In apparatus for producing on a charge-retentive medium movable along a predetermined path a record comprising groupings of dot-like visible markings representing selected information, the combination of means defining a recording station at one position along such path, means defining a developing station at a later position along said path, a group of spaced-apart pin electrodes at said recording station having the discharge surfaces thereof adjacent to one side of said path, said group extending laterally of the direction of displacement of the medium therealong, electrode means cooperative with all said pin electrodes positioned adjacent thereto but spaced therefrom on the opposite side of said path so as to include the path therebetween, means for selectively energizing one, or simultaneously energizing a group, of said pin electrodes relative to said electrode means to a potential sufficient to electrostatically charge a charge-retentive medium travelling along said path between said electrode means and said pin electrodes, means at said developing station for causing uncharged powdered material to come in contact with a medium so charged travelling along said path, and means for transporting such a medium along said path.

References Cited in the file of this patent

UNITED STATES PATENTS

| | | |
|---|---|---|
| 2,143,214 | Selenyi | Jan. 10, 1939 |
| 2,143,376 | Hansell | Jan. 10, 1939 |
| 2,200,741 | Gray | May 14, 1940 |
| 2,221,776 | Carlson | Nov. 19, 1940 |
| 2,453,484 | Young | Nov. 9, 1948 |
| 2,473,729 | Salz | June 21, 1949 |
| 2,557,022 | Wolowitz | June 12, 1951 |
| 2,618,551 | Walkup | Nov. 18, 1952 |
| 2,624,652 | Carlson | Jan. 6, 1953 |
| 2,716,048 | Young | Aug. 23, 1955 |
| 2,771,336 | MacGriff | Nov. 20, 1956 |